United States Patent [19]
Schull et al.

[11] Patent Number: 5,521,964
[45] Date of Patent: * May 28, 1996

[54] VISUAL MESSAGE WAITING INDICATION IN A TELEPHONE VOICE MESSAGE SYSTEM

[75] Inventors: Jerome W. Schull, Marietta; Wayne R. Howe, Duluth, both of Ga.

[73] Assignee: BellSouth Corporation, Atlanta, Ga.

[*] Notice: The portion of the term of this patent subsequent to Nov. 8, 2011, has been disclaimed.

[21] Appl. No.: 330,690

[22] Filed: Oct. 28, 1994

Related U.S. Application Data

[63] Continuation-in-part of Ser. No. 995,025, Dec. 22, 1992, Pat. No. 5,363,431.

[51] Int. Cl.⁶ .................................................. H04M 11/00
[52] U.S. Cl. ........................... 379/67; 379/92; 379/105; 379/393; 379/88
[58] Field of Search .................................. 379/67, 88, 89, 379/396, 393, 105

[56] References Cited

U.S. PATENT DOCUMENTS

| | | | |
|---|---|---|---|
| 4,453,041 | 6/1984 | Castro et al. | 179/84 |
| 4,468,541 | 8/1984 | Cohen | 179/84 |
| 4,811,381 | 3/1989 | Woo et al. | 379/67 |
| 4,853,952 | 8/1989 | Jachmann et al. | 379/88 |
| 4,969,186 | 11/1990 | Sayre, II | 379/376 |
| 4,972,461 | 11/1990 | Brown et al. | 379/67 |
| 5,003,577 | 3/1991 | Ertz et al. | 379/89 |
| 5,189,694 | 2/1993 | Garland | 379/106 |
| 5,363,431 | 11/1994 | Schull et al. | 379/67 |

*Primary Examiner*—Jeffery Hofsass
*Assistant Examiner*—Parag Dharia
*Attorney, Agent, or Firm*—Robin, Blecker, Daley & Driscoll

[57] ABSTRACT

A telephone system which offers a voice message service and which enables visual indication of waiting messages at subscriber locations using suppressed ringing connections through the switching network of the system and in which acknowledgement signals are provided to the system by the subscriber locations.

53 Claims, 4 Drawing Sheets

VISUAL MESSAGE WAITING
VIA UTILITY TELEMETRY SERVICE

VISUAL MESSAGE WAITING
VIA SUPPRESSED RINGING

VISUAL MESSAGE WAITING
VIA UTILITY TELEMETRY SERVICE

VISUAL MESSAGE WAITING INDICATION IN A TELEPHONE VOICE MESSAGE SYSTEM

This application is a continuation-in-part of U.S. application Ser. No. 07/995,025, filed Dec. 22, 1992.

BACKGROUND OF THE INVENTION

This invention relates to telephone systems and, in particular, to telephone systems which offer voice message services for their subscribers.

Many telephone systems now include voice message services which can be subscribed to by the telephone subscriber locations served by the system. In these telephone systems, a voice message system can be accessed via the central office switch serving the subscriber locations. Communication between the switch and the subscriber locations is over analog or digital lines to the subscriber locations. These lines may be connected by direct metallic path to the switch or through subscriber loop carriers.

For subscriber locations utilizing the voice message service, the voice message system acts to record unanswered calls to the locations. These calls can then be accessed later by the subscriber locations. The voice message system communicates with the central office switch over so-called "simplified message desk interface" links. Via these links, the voice message system transmits message waiting indicator requests and message completion requests to the switch.

The message waiting indicator requests identify the telephone numbers of the subscriber locations having recorded messages at the voice message system. These requests instruct the switch to send stutter dial tone to the subscriber locations when the subscriber locations go off-hook. The stutter dial tone provides an audible indication that a voice message is waiting.

A subscriber location can then access the voice message system over its established voice path and any waiting message can be transmitted by the voice message system to the subscriber location. After the subscriber accesses the voice message system, the voice message system sends a completion request to the switch, instructing it to discontinue sending stutter dial tone and to now send normal dial tone to the subscriber location when it goes off-hook.

As can be appreciated, in the above telephone system, the necessity for the subscriber location to go off-hook in order to be made aware of waiting messages requires frequent monitoring by the subscriber location. This limits the attractiveness of the voice message service as compared to other voice message systems, such as, for example, answering machines, which include visual indicators, e.g., lamps, which provide a ready visual indication that a message is waiting.

It is, therefore, an object of the present invention to provide a telephone system and method of the above-type in which a visual indication that there are voice messages waiting on a voice message system can be established at a subscriber location.

It is a further object of the present invention to provide a telephone system and method of the above-type in which a visual indication that there are voice messages waiting on a voice message system can be established using existing systems and with a minimal disturbance at the subscriber location.

SUMMARY OF THE INVENTION

In accordance with the principles of the present invention, the above and other objectives are realized in a telephone system of the above type by further including in the system a control means which is responsive to the message waiting indicator requests associated with the voice message system and which establishes so-called "suppressed ringing connections" through the central office switch to the subscriber locations associated with the requests. Visual message waiting indicator signals can then be transmitted over the suppressed ringing connections to visual message waiting indicator interfaces at the subscriber locations.

After the visual message waiting indicator signals are transmitted, the control means awaits acknowledgement signals from the visual message waiting indicator interfaces. Upon proper receipt of the visual message waiting indicator signals, the interfaces transmit the appropriate acknowledgement signals and activate visual indicators to visually indicate the presence of waiting messages. Subscriber locations are thus made aware of waiting messages without the need to go off-hook and without being disturbed by ringing.

In both of the embodiments of the invention to be described hereinbelow, the control means includes a central office service unit and associated telephone trunks which are configured to interact with the central office switch to establish the suppressed ringing connections to the subscriber locations. In a first of the disclosed embodiments, the control means further includes a local control computer which controls the central office service unit and which monitors the links carrying the message waiting indicator requests to the central office switch. In a second of the disclosed embodiments, the control means further includes a centralized control computer which controls the central office service unit. In this case, the centralized computer receives message waiting indicator signals or requests associated with the voice message system via the a data network such as a public packet switching network and routes these requests over such network to the central office service unit.

In both of the described embodiments, the acknowledgement signal from the visual message waiting indicator interfaces is in the form of an off-hook wink signal of approximately 500 ms to 1 second in duration.

Also disclosed are various ways of effecting visual message waiting indication if a subscriber location is busy.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
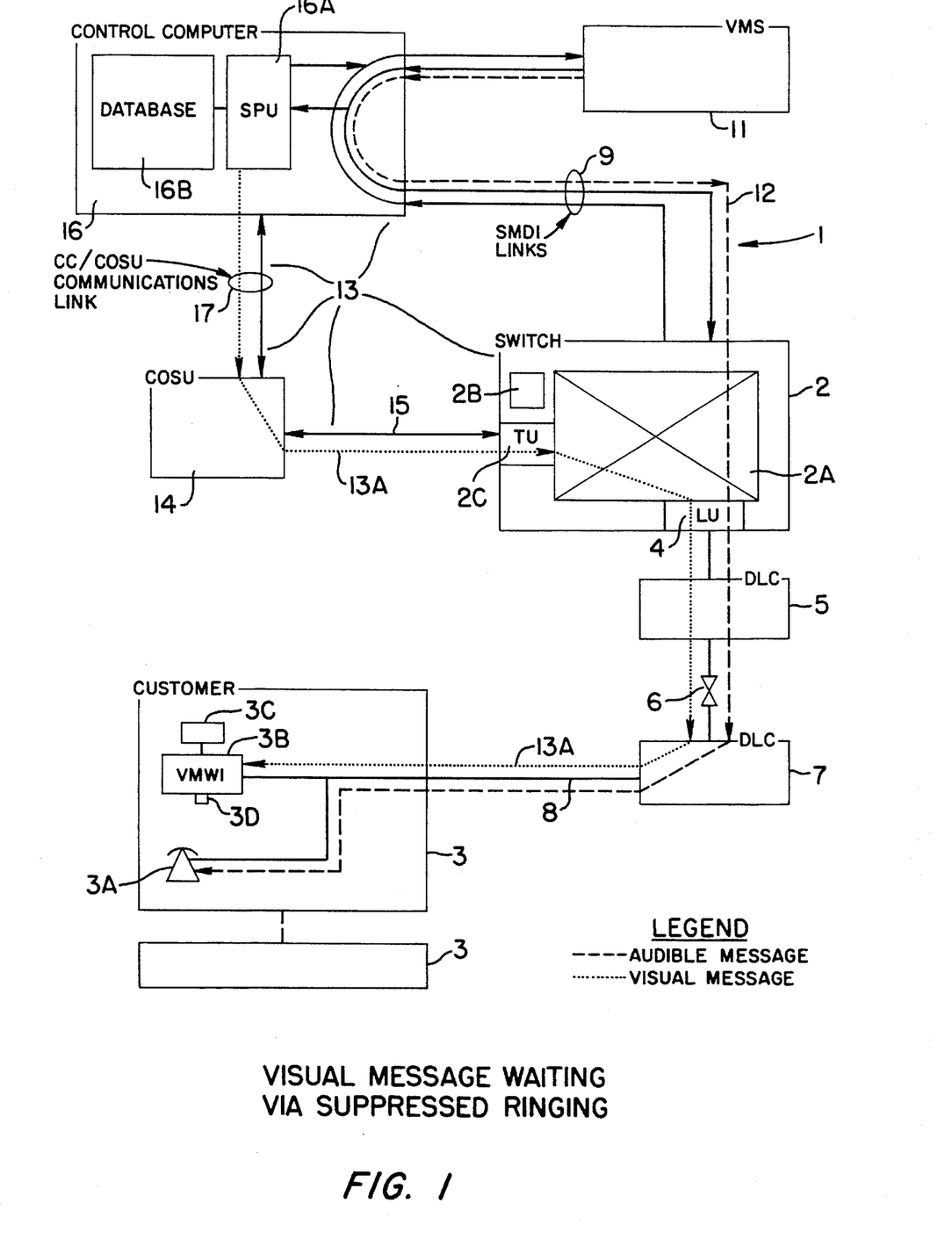
FIG. 1 shows a telephone system in accordance with a first embodiment of the present invention.

FIG. 1 shows a telephone system i in accordance with the principles of the present invention. The telephone system 1 comprises a central office switch 2, shown as a program driven digital switch (e.g., an AT&T No. 5 ESS). The switch 2 includes a switching network 2A and a program controlled processor 2B. The latter controls the switching network 2A so as to provide voice path connections for communicating with subscriber locations 3 served by the switch. Communication between each subscriber location 3 and the switching network 2A occurs via a line unit 4, a digital loop carrier 5 at the switch location, a transmission path 6 (shown as a T1 carrier), a digital loop carrier 7 at a remote location and a subscriber line 8.

The central office switch 2 is also coupled via simplified message desk interface links 9 to a voice message system 11. The voice message system 11 permits the telephone system to provide a voice message service for the subscriber locations 3. Subscriber locations 3 which subscribe to the voice message service can have their unanswered telephone calls directed to the voice message system 11 where they are recorded. The subscriber locations 3 can then listen to these recorded messages by accessing the voice message system when they go off-hook at their telephone stations 3A.

In order to alert a subscriber location 3 that a message is waiting at the voice message system 11, the voice message system sends a message waiting indicator request or signal over the simplified message desk interface links 9 to the switch 2. This request includes the telephone number of the subscriber location and instructs the switch to transmit a stutter dial tone to the subscriber location when the location goes off-hook. When this occurs, an audible message is established, i.e., the stutter dial tone, indicated by dashed path 12 in FIG. 1, by which the off-hook subscriber location can recognize that a voice message is waiting. The subscriber location can then query the voice message system 11 to retrieve the recorded message.

As can be appreciated, with the above system, the subscriber locations 3 must go off-hook before they are alerted that a message is waiting on the voice message system 11. A subscriber location must thus go off-hook periodically in order to be sure that it has no waiting messages. Such a procedure becomes burdensome and is often not followed, resulting in delays in a subscriber location obtaining and responding to recorded messages.

In accordance with the principles of the present invention, the aforesaid drawback of the system 1 is overcome by further adapting the system such that the existence of waiting messages at the voice message system 11 can be indicated visually at the subscriber locations 3. Moreover, this is accomplished without substantial ringing (i.e., with no ringing or only minimal ringing) at the subscriber locations so that no or little disturbance occurs at the locations.

More particularly, in accord with the invention, the system 1 is further adapted to include a control system 13 which is configured to establish suppressed ringing connections through the switch 2 to the subscriber locations 3. These connections are established by the control system 13 in response to message waiting indicator requests associated with (and in the present illustrative example) developed by the voice message system 11.

In response to these requests, the control system 13 is adapted to transmit over the suppressed ringing connections visual message waiting indicator requests or signals. These requests are received at the subscriber locations 3 by visual message waiting indicator interfaces 3B. These interfaces, in turn, acknowledge to the control system 13 receipt of these requests and further respond to the requests by activating visual indicators 3C (e.g., lamps) to indicate the presence of a waiting message at the voice message system 11. In FIG. 1, the path in the system 1 for establishing such visual indication for waiting messages is shown by dotted line 13A.

As shown, the control system 13 includes a central office service unit 14 and associated trunks 15. The unit 14 and the trunks 15 control the trunk unit 2C of the switch 2 to establish the desired suppressed ringing connections to the subscriber locations 3. To this end, the unit 14 and trunks 15 can be similar to the central office service unit and utility telemetry trunks, respectively, described in the telemetry system of European Published Patent Application 0 474 407 A1, the teachings of which are incorporated herein by reference.

As set forth in such application, the trunks 15 have a class of service which identifies to the switch 2 that the connections being requested by the central office service unit 14 are to be made with ringing suppressed, i.e., with no ringing signal transmitted or with a burst of ringing signal transmitted of sufficient length to activate the digital loop carriers but of insufficient length to be present for any significant time after connection is completed. Accordingly, the central office service unit 14 can establish connections through the switch 2 to the subscriber locations 3 which are accompanied by no or little (i.e., short) ringing.

The visual message waiting indicator interface 3B used at the subscriber locations can also operate similarly to the meter interface units used in the '407 patent application. Thus, each interface unit 3B can respond to control messages (analog tone messages over lines 8 as defined in Bellcore Technical Reference TR-TSY-000030) from the central office service unit 14 to activate or alert the unit as well as to cause the unit to activate the corresponding visual indicator 3C.

A control computer 16 of the control system 13 is used to monitor the message waiting indicator requests on the simplified message desk indicator links 9. The control computer 16 then generates corresponding visual message waiting indicator requests and transmits these requests to the central office service unit 14 via communication links 17. The unit 14 thereupon sets up the suppressed ringing connections to the appropriate subscriber locations 3, causing the indicator requests to be transmitted to the interfaces 3B. The interfaces, upon proper receipt of such requests, generate acknowledgement signals which are carried back over the established connections to the control unit 14 which reports then to control computer 16 which, in turn, reports then to the voice message system 11. The interfaces 3B are further activated by these requests causing their associated visual indicators 3C to be activated, thereby providing the desired visual indication of the waiting messages.

Figure 2:
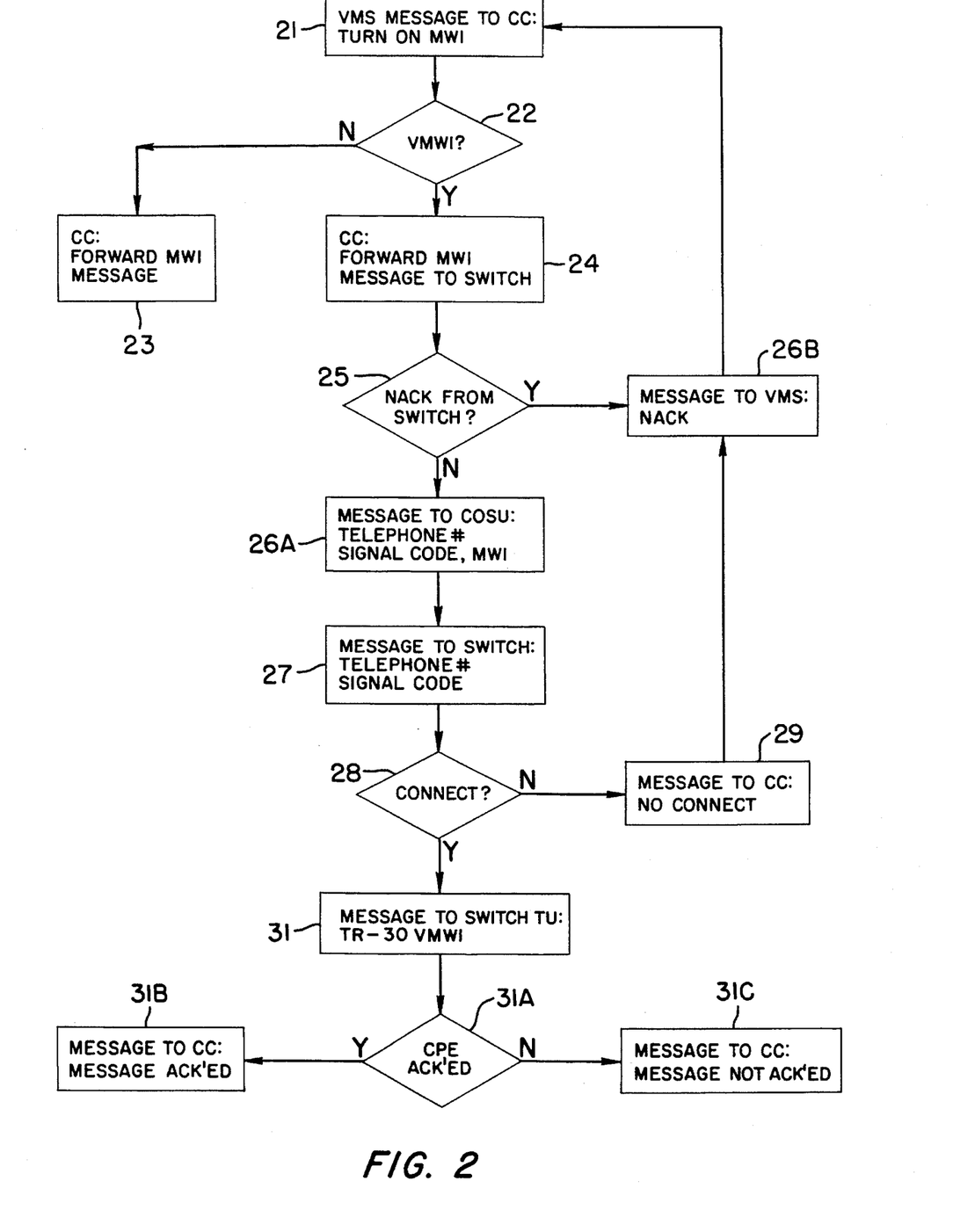
FIG. 2 shows a flow chart of the operation of the system of FIG. 1.

The detailed operation of control system 13 can be described in conjunction with the flow chart of FIG. 2. As indicated therein, in step 21, the voice message system 11 transmits on the links 9 a message waiting indicator request associated with a particular subscriber location 3 having a message waiting at the voice message system 11. This is indicated in the request, as above-noted, by the telephone number of the subscriber location. The control computer 16 receives or monitors this request in step 21, causing it to initiate its message waiting processing.

In step 22, the central processing unit 16A of the control computer 16 verifies, via the telephone number contained in the request and via its data base 16B, whether the subscriber location 3 subscribes to the visual message waiting indicating service. If the subscriber location does not subscribe to this service, the process proceeds to step 23 wherein the message waiting indicator request is sent to the switch 2. If control computer 16 is configured to monitor the request, the request is allowed to pass on normally to provide stutter dial tone message waiting indication only. If the control computer 16 is configured to process the request, the request is processed true to provide stutter dial tone message waiting indication only.

If the subscriber location subscribes to the visual message waiting service, the process moves to step 24 wherein the control computer 16 again sends the message waiting indicator request to the switch 2. At step 25, if the switch 2 is unavailable for processing the message waiting request, then the switch either fails to acknowledge receipt of the message waiting request or sends a response indicating that the message waiting request was not processed. In such case process moves to step 26B, in which a message is sent to the voice message system 11 indicating that the switch 2 is unavailable. The voice message system 11 will thereupon attempt to resend the request until the message waiting request is processed.

When the switch 2 indicates that the switch is available for processing, process proceeds to step 26A. In step 26A, the control computer sends a message to the central office service unit 14 requesting that a suppressed ringing connection be established to the appropriate subscriber location for visual message waiting indicator service. This message to the unit 14 includes the telephone number of the subscriber location and a signal code identifying the type of loop carrier in the connecting path to the subscriber location. In step 27, the service unit 14 sends a message containing similar information to the trunk unit 2C of the switch 2 instructing the switch to make the appropriate suppressed ringing connection.

In step 28, if the switch and/or subscriber location are unavailable, a no connect message is sent to the control computer 16 in step 29. The no connect message returns the process to step 26B, causing a message to be sent to the voice message system 11 that the switch 2 is unavailable. The voice message system will then again attempt to periodically resend the message waiting indicator request until the process can be completed.

If a connect is made in step 28, the service unit 14 transmits a visual message waiting indicator request to the trunk unit 2C in step 31. This message is transmitted to the visual message waiting interface unit 3B and, if properly received, causes the interface and the visual indicator 3C at the subscriber location 3 to be activated.

In step 31A, the central office service unit awaits an acknowledgement signal from the visual message waiting interface unit 3B indicating proper receipt of the message waiting indicator request. This acknowledgement signal is, preferably, an off-hook wink signal of approximately 500 ms to 1 second in duration. Upon receipt of this signal from the switch 2, the service unit 14 reports to the control computer 16 in step 31B that the request has been acknowledged. The control computer then passes this report on to the voice message system 11, indicating that the message waiting indicator request has been processed.

If after waiting a predetermined period of time (e.g., 1 second), the service unit 14 does not receive from the switch 2 an acknowledgement of the message waiting indicator request, the service unit 14 reports this to the control computer 16 in step 31C. The control computer 16 will then attempt to periodically resend the request until an acknowledgement is received and the process is completed.

When a subscriber location 3 responds to an activated visual indicator 3C by going off-hook, the subscriber location first hears stutter dial tone which confirms the visual indication and results from the audible message waiting indicating service as discussed above. The subscriber location 3 then accesses the recorded messages from the voice message system.

After the subscriber location 3 accesses the voice message system 11 (e.g., after message retrieval and going on-hook), the voice message system 11 sends a completion request to the switch 2 instructing the switch 2 to provide normal or continuous dial tone to the subscriber location 3. The control computer 16 monitors this completion request on the links 9 and upon receipt of the completion request sends a completion message to the central office service unit 14. This message causes the unit 14 to establish a suppressed ringing connection over which the completion message is transmitted to the interface unit 3B at the subscriber location 3. The completion message instructs the interface to deactivate the visual indicator 3C which is then deactivated.

As an alternative to the control computer 16 and central office service unit 14 causing deactivation of the visual indicators 3C at the subscriber locations 3, the message waiting indicator interfaces 3B can be provided with an accessible deactivator button 3D which when pressed causes the interface to deactivate the corresponding visual indicator 3C. A subscriber location 3, after retrieving any waiting messages, can then activate the button 3D and deactivate the indicator 3C.

In the event that the central office service unit 14 is instructed by the control computer 16 to establish a suppressed ringing connection to a subscriber location and the subscriber location 3 is busy, the service unit 14 communicates this busy condition to the control computer 16. The control computer 16, in turn, communicates this condition to the voice message system 11 which then knows that the visual indicator 3C at the subscriber location 3 has not been activated. The voice message system 11 will then retry to establish a connection by periodically transmitting a further voice message waiting indicator request.

Figure 3:
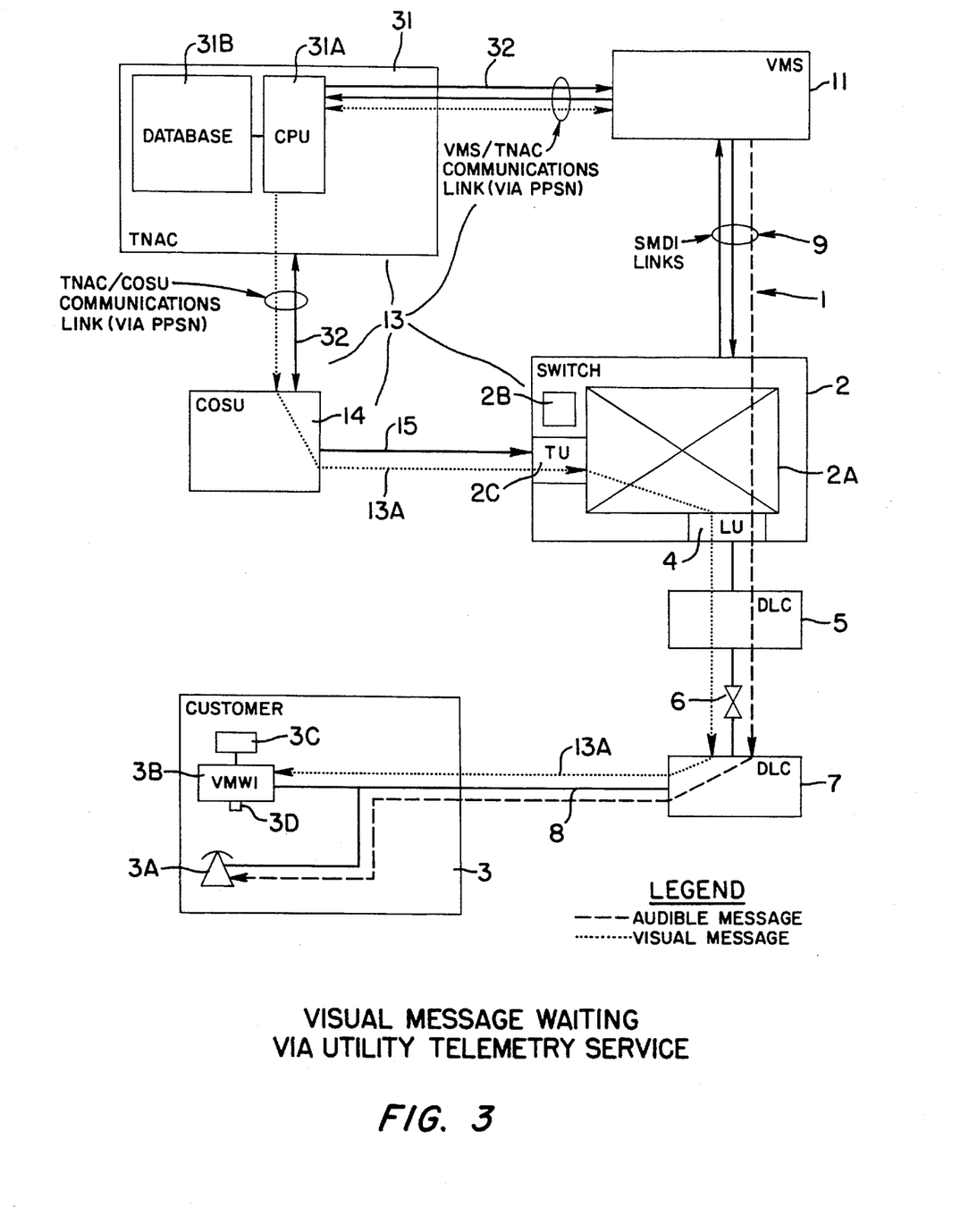
FIG. 3 shows a telephone system in accordance with a second embodiment of the present invention.

FIG. 3 shows a second embodiment of a telephone system 1 in accordance with the principles of the present invention. In this case, components similar to the components in the embodiment of FIG. 1 have been identified similarly. As can be seen, in this embodiment, a centralized control computer 31 is used to control central office service unit 14. The centralized control computer 31 communicates with the voice message system 11 over standard public telephone communication links 32.

Preferably, the centralized control computer 31 can be a telemetry network access computer ("TNAC") which provides telemetry control for a number of central office service units which are part of a telemetry system of the type described in the '407 application. In such case, the central office service unit 14 can also be part of the telemetry system and provide suppressed ringing connections to the subscriber locations 3 for telemetry purposes, as well as for visual message waiting indicator purposes in accordance with the present invention. Also, in such case, the interface 3B might be part of a meter interface unit of the type also described in the '407 application.

As can be seen, in the FIG. 3 embodiment, the voice message system 11 sends separate visual message waiting indicating requests to the centralized control computer 31 for establishing the visual message waiting indications at the subscriber locations 3. The system 11 also sends separate message waiting indicator requests over the simplified message desk interface links 9 to establish for the subscriber locations audible, i.e., stutter dial tone, message waiting indications at these locations.

The voice message system 11 transmits its requests to the centralized control computer 31 over data links, shown as standard public packet switched network interface links 32 of the telephone system 1. Similarly, the messages transmitted between the centralized control computer 31 and the central office service unit 14 are also over data links, again shown as public packet switched network interface links.

Figure 4:
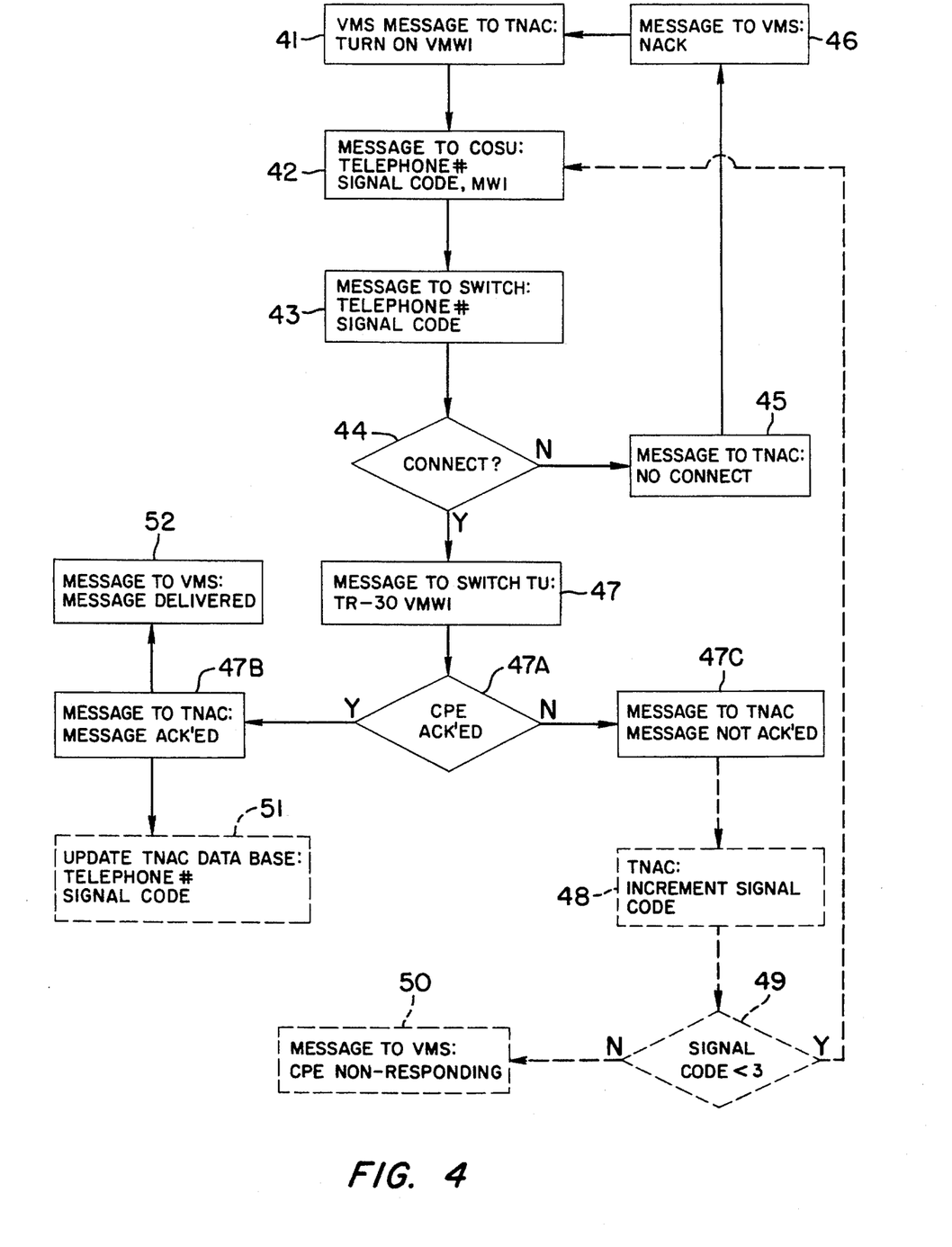
FIG. 4 shows a flow chart of the operation of the system of FIG. 3.

FIG. 4 depicts a flow diagram showing the operation of the system 1 of FIG. 3 to establish a visual indication of a waiting message at a subscriber location 3. In step 41, the voice message system 11 transmits a message waiting indicator request or signal over the public packet switched network links 32 to the centralized control computer 31 instructing it to initiate its visual message waiting indicator processing. In step 42, the central processing unit 31A of the centralized control computer 31 determines from the telephone number in the request and from its data base 31B that it must transmit message waiting indicator messages to the central office service unit 14 serving the subscriber location 3 whose visual indicator is to be activated. The centralized control computer 31 then determines the routing to be used for these messages and a message containing the telephone number and loop carrier identification or signal code is transmitted.

In step 43, the central office service unit 14, upon receipt of the transmitted message, sends a message to the switch 2 with the same information, i.e., telephone number and identification or signal code, instructing the switch 2 to make a suppressed ringing connection.

In step 44, if the switch 2 cannot make the connection, process moves to step 45 wherein the central office service unit 14 sends a message to centralized control computer 31 indicating that the connection cannot be made. Process than moves to step 46 wherein the centralized control computer sends a message to the voice message system indicating that acknowledgement from the switch 2 has not been received. In this case, the voice message system 11 will retry periodically to resend the message waiting indicator request to the central computer 31 to establish the connection and activate the visual indicator at the subscriber location.

If a connection is made in step 44, process moves to step 47 wherein the centralized control computer 31 sends a visual message waiting indicator signal over the established connection to the subscriber location. This signal, if properly received, activates the associated interface 3B and visual indicator 3C so that the desired visual indication of the waiting message results.

In step 47A, the central office service unit 14 awaits an acknowledgement signal from the message waiting indicator interface 3B indicating proper-receipt of the visual message waiting indicator signal. This acknowledgement signal is again, preferably, an off-hook wink signal of approximately 500 ms to 1 second in duration. Upon receipt of this signal from the switch 2, the central office service unit 14 reports the acknowledgement to the centralized control computer 31 in step 47B. In step 52, the control computer then reports to the voice message system 11 that the message waiting indicator signal has been delivered.

If after waiting a predetermined time period, e.g., 1 second, the central office service unit 14 does not receive from the switch 2 an acknowledgement of the proper receipt of the visual message waiting indicator signal, process passes to step 47C in which the service unit reports this lack of acknowledgement to the centralized control computer 31.

The control computer 31 will then attempt to periodically resend the signal until an acknowledgement is received and the process is completed.

The method of operation of the system of FIG. 3 shown in FIG. 4 can be modified so as to utilize the acknowledgement signal from the visual message waiting indicator interface 3B to also determine and/or confirm the correct signal code for the loop-carrier serving the subscriber location 3. This modified operation is indicated by the boxes shown in dotted line in FIG. 4.

When an acknowledgement signal acknowledging receipt of a visual message waiting indicator signal is received at the centralized control computer 31, such receipt indicates that the suppressed ringing connection to the subscriber location 3 has been established and, thus, that the signal code used to establish the connection is the correct signal code. Accordingly, after an acknowledgement signal is received, in step 51, the control computer 31 is caused to update its data base 31B for the subscriber location 3 and the corresponding telephone number with the signal code used for the completed connection.

When the centralized control computer 31 is advised by the central office service unit 31 in step 47C, that no acknowledgement signal has been received, the control computer 31 recognizes that the failure to complete the connection may have been due to the of use of an incorrect signal code in attempting to establish the connection. Accordingly, in step 48, the control computer 31 increments the signal code to a next successive signal code in a set of available signal codes for the subscriber locations 3. In step 49, a check is made to ensure that the incremented signal code has not exceeded the codes available. If this condition is satisfied, the incremented signal code is then used by centralized control computer 31 to resend a further visual message waiting indicator request so as to reattempt to establish the connection.

Steps 42, 43, 44, 47, 47A, 47C, 48 and 49 are then repeated until either an acknowledgement signal is received at the central office service unit 14, resulting in steps 47B, 51 and 52 being carried out, as above-described, or the available signal codes are exhausted. In the latter case, in step 50, a message is sent back to the centralized control computer 31 and voice message system 11 indicating that the subscriber location 3 is not responding.

In the embodiment of the invention in FIG. 3, the deactivation of the visual indicator 3C at a subscriber location 3 can be accomplished in a similar manner as in the embodiment of FIG. 1. Thus, after the voice message system 11 has been accessed by the subscriber location (e.g., completes retrieval of its recorded messages), the voice message system sends a completion message to the centralized control computer 31. The centralized control computer 31 then sends a corresponding message to the central office service unit 14. The unit 14, in turn, via a suppressed ringing connection through switch 2, transmits the completion message to the interface unit 3B which will then deactivate the visual indicator 3C. Alternatively, a deactivation button 3D on the interface 3B can be used to deactivate the indicator 3C.

As is the case of the FIG. 1 embodiment, if the central office service unit 14 attempts to establish a suppressed ringing connection through the switch 2 to a subscriber location 3 that is busy, this condition is reported by the switch to the service unit. The service unit, in turn, reports the busy condition to the centralized control computer 31 which reports the condition to the voice message system 11.

The voice message system 11 will then retry to complete the visual message waiting indication process by periodically sending a further voice message waiting indicator request.

In the system 1 of FIG. 3, the establishment of the stutter dial tone message waiting indication via the voice message waiting requests on the links 9 is as described for the FIG. 1 system. It, therefore, will not be further described.

In the FIG. 3 system, the simplified message desk protocol used to communicate between the voice message system and the centralized control computer 31 has to be modified from the standard format to support positive acknowledgement. Also, the voice message system 11 has to be adapted to maintain records of visual message waiting requirements.

In the FIG. 1 embodiment, the voice message system 11 can be a standard system. However, the local control computer 16 requires hardware sufficient to accommodate monitoring of the simplified message desk interface links 9.

In the discussion of the embodiments of FIGS. 1 and 2 above, when a suppressed ring connection was attempted through the switch 2 to a busy subscriber location 3, this condition was reported back through the system to the voice message system 11. The voice message system would then resend a message waiting indicator request periodically to attempt to make the connection and complete the visual message waiting indicator process. However, the system 1 of the invention can be made to respond to a busy subscriber location in a variety of other ways.

More particularly, the trunks 15 and trunk unit 2C of the system 1 can be adapted to include a so-called "barge in" capability (i.e., a capability similar to that currently used to send specific tones like Call Waiting Tone to a busy line during an on-going or active call). With such a capability, when the central office service unit 14 attempts to make a suppressed ringing connection to a subscriber location 3 and the location is busy, the barge-in function of the trunks 15 and trunk unit 2C is activated.

The switch 2 is then directed to send a unique visual message waiting tone (like a Call Waiting tone) over the active connection onto the busy or active subscriber line 8 of the subscriber location 3. Alternatively, the switch 2 could bridge the central office service unit 14 onto the active connection and active subscriber line 8 and the central office service unit could place such tone thereon. In each case, the tone would be transmitted only over the active connection to the subscriber line 8 and not onto the line which is in communication with such subscriber line.

The interface unit 3B receives this tone and, in response thereto, the interface unit activates the indicator 3C at the subscriber location. In this case, the busy condition of the subscriber location 3 would not interfere with visual message waiting indicator processing and this procedure would eliminate the need for the voice message system to resend requests to complete the process.

Another alternative mode of operation of the system 1 in the case of a busy subscriber location, is to adapt the switch 2 so that its Automatic Callback function is brought into operation. In this case, when the busy condition of the subscriber location ends, i.e., the subscriber location goes on-hook, the Automatic Callback function of the switch 2 activates, causing the switch to send over the trunks 15 to the central office service unit 14 a message containing the directory number of the particular subscriber location.

The central office service unit 14 then sends the number to the control computer (either computer 16 or 31) which would retransmit a message waiting indicator request with the identified directory number back to the central office service unit 14. The service unit then attempts to make the suppressed ring connection as previously discussed above to provide the visual message waiting indicator activation.

As a further alternative for operation in the case of a busy subscriber location, the system 1 can be adapted to include an Advance Intelligent Network (AIN) function similar to the Automatic Callback function which establishes a trigger on a subscriber location line 8 when a suppressed ringing connection has been tried and the subscriber location is busy. When the busy condition of the subscriber location ends by the subscriber location hanging up, the AIN trigger activates the function which sends a message to the central office service unit 14 over the trunks 15 (or over a data network such as a public packet switched network) containing the telephone number of the subscriber location. This information may be stored either internally to the switch 2 or using an external data base.

The central office service unit 14 then reacts as in the previous case to report this to the control computer. The control computer then proceeds by sending a message waiting indicator request to the service unit 14 to establish the suppressed ringing connection and visual message waiting indication.

It should be noted that the telephone system of the invention can be modified such that the voice message system 11 communicates directly with the trunk unit 2C of the switch 2 to establish the suppressed ringing connections and the visual message waiting indication. In this case, the voice message system must be configured to accommodate the protocol of the trunk unit messages.

It should also be noted that the invention can be practiced by sending a very brief ringing signal to the subscriber locations, instead of entirely suppressing any ringing. This can be established by controlling the processing for the suppressed ringing connection so that a brief ringing is present after a connection is established.

Finally, it should be noted that in the system of FIGS. 1 and 2, if a subscriber location goes off hook during the process of visual message activation, the system may react similarly as in the '407 application by quickly terminating the visual message activation process and allowing the subscriber location to engage in normal telephone service.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention. Thus, for example, the functions performed by the local computer 16 in FIG. 1 can be incorporated into the switch 2 and/or the voice message system 11, if desired. Likewise, the functions performed by the central office service unit 14 of FIGS. 1 and 2 can be incorporated into the switch 2 and/or the voice message system 11.

What is claimed is:

1. A telephone system comprising:

a telephone switching network responsive to telephone subscriber locations for providing telephone connections for said telephone subscriber locations including connections to a voice message system;

and first means responsive to a message waiting indicator signal associated with a particular subscriber location, said message waiting indicator signal including indicating that said voice message system contains a message, and said first means acting to attempt to establish a suppressed ringing connection through said telephone switching network to the particular subscriber location associated with said message waiting indicator signal and said first means awaiting an acknowledgement signal from the particular subscriber location after said attempted establishment of said suppressed ringing connection to said particular subscriber location.

2. A telephone system in accordance with claim 1 wherein:

said suppressed ringing connection is such that no ringing occurs at the particular subscriber location.

3. A telephone system in accordance with claim 1 wherein:

said suppressed ringing connection is such that no substantial ringing occurs at the particular subscriber location.

4. A telephone system in accordance with claim 1 wherein:

said first means includes means for transmitting over said established suppressed ringing connection a message for activating a visual indicator at said particular subscriber location.

5. A telephone system in accordance with claim 3 further comprising:

said voice message system;

and said subscriber locations, said particular subscriber location including said visual indicator.

6. A telephone system in accordance with claim 1 wherein:

said first means includes a program driven processor for controlling said telephone switching network.

7. A telephone system in accordance with claim 1 further comprising:

second means responsive to said message waiting indicator signal for controlling said telephone switching network so that said particular subscriber location receives stutter dial tone when said particular subscriber location goes off-hook.

8. A telephone system in accordance with claim 1 wherein:

said first means comprises: a control computer responsive to said message waiting indicator signal; and control processing means for establishing said suppressed ringing connection based upon messages from said control computer.

9. A telephone system in accordance with claim 8 wherein:

said telephone system includes a link for conveying said message waiting indicator signal to said first means;

and said control computer is a local control computer which monitors said link.

10. A telephone system in accordance with claim 9 wherein:

said link is a simplified message desk interface link.

11. A telephone system in accordance with claim 9 further comprising:

second means responsive to said message waiting indicator signal for controlling said telephone switching network so that said particular subscriber location receives stutter dial tone when said particular subscriber location goes off-hook.

12. A telephone system in accordance with claim 8 wherein:

said control computer is a centralized control computer of said telephone system.

13. A telephone system in accordance with claim 12 wherein:

said centralized control computer receives said message waiting indicator signal over a data network and provides messages to said control means over a data network.

14. A telephone system in accordance with claim 13 wherein:

said voice message system generates a further message waiting indicator signal;

and said system further includes second means responsive to said further message waiting indicator signal for controlling said telephone switching network so that said particular subscriber location receives stutter dial tone when said particular subscriber location goes off-hook.

15. A telephone system in accordance with claim 14 further comprising:

a telephone link for conveying said further message waiting indicator signal to said first means.

16. A telephone system in accordance with claim 15 wherein:

said telephone link is a simplified message desk interface link.

17. A telephone system in accordance with claim 13 wherein:

said centralized control computer is a telemetry control computer used for telemetry operations in said telephone system.

18. A telephone system in accordance with claim 1 wherein:

said voice message system generates a completion signal after said particular subscriber location accesses said voice message system;

and said first means is responsive to said completion signal for enabling deactivation of said visual indicator.

19. A telephone system in accordance with claim 1 wherein:

said first means includes further means responsive to a busy condition of said particular subscriber location, which busy condition prevents said first means from establishing said suppressed ringing connection to said particular subscriber location, for controlling said telephone switching network to transmit a message over the active connection to said subscriber location for activating a visual indicator at said particular subscriber location.

20. A telephone system in accordance with claim 1 wherein:

said further means is analogous to a means for carrying out a Call Waiting function.

21. A telephone system in accordance with claim 1 wherein:

said first means includes further means responsive to a busy condition of said particular subscriber location, which busy condition prevents said first means from establishing said suppressed ring connection to said particular subscriber location, and which is further responsive to the ending of said busy condition of said particular subscriber location, for automatically attempting to establish a suppressed ring connection through said telephone switching network to said particular subscriber location.

22. A telephone system in accordance with claim 1 wherein:

said acknowledgement signal is an off-hook wink signal of predetermined duration.

23. A telephone system in accordance with claim 22 wherein:

said predetermined duration is within a range of 500 msec to 1 second.

24. A telephone system in accordance with claim 1 wherein:

after waiting a predetermined time period for receipt of an acknowledgement signal, said first means reattempts to establish a suppressed ringing connection through said telephone switching network to the particular subscriber location.

25. A telephone system in accordance with claim 1 wherein:

said message waiting indicator signal includes a signal code associated with a loop carrier; and said first means utilizes said signal code in attempting to establish said suppressed ringing connection through said telephone switching network to said particular subscriber location.

26. A telephone system in accordance with claim 25 wherein:

upon receipt of said acknowledgement signal, said first means updates a database with the signal code utilized to establish the suppressed ringing connection.

27. A telephone system in accordance with claim 26 wherein:

after waiting a predetermined time period for receipt of an acknowledgement signal, said first means increments said signal code from a plurality of available signal codes for said subscriber locations and reattempts to establish a suppressed ringing connection through said telephone switching network to the particular subscriber location using the incremented signal code and further awaits a further predetermined time period for receipt of an acknowledgement signal, and said further means repeats said incrementing, reattempting and further waiting until an acknowledgement signal is received or the signal codes in said plurality of signal codes is exhausted.

28. A method for use with a telephone switching network which is responsive to telephone subscriber locations for providing telephone connections for said telephone subscriber locations including connections to a voice message system, comprising:

generating a message waiting indicator request signal associated with a particular subscriber location, said message waiting indicator request signal indicating that said voice message system contains a message;

based on said message waiting indicator request signal, attempting to establish a suppressed ringing connection through said telephone switching network to the particular subscriber location associated with said message waiting indicator request signal;

and awaiting an acknowledgement signal from the particular subscriber location after said attempted establishment of said suppressed ringing connection to said particular subscriber location.

29. A method in accordance with claim 28 wherein:

said suppressed ring connection is such that no ringing occurs at the particular subscriber location.

30. A method in accordance with claim 29 wherein:

said suppressed ring connection is such that no substantial ringing occurs at said particular subscriber location.

31. A method in accordance with claim 28 further comprising:

transmitting over said established suppressed ringing connection a visual message waiting indicator signal for activating a visual indicator at said particular subscriber location.

32. A method in accordance with claim 28 wherein:

said establishing of said suppressed ringing connection includes using a program driven processor for controlling said telephone switching network.

33. A method in accordance with claim 28 further comprising:

based on said message waiting indicator request signal, controlling said telephone switching network so that said particular subscriber location receives stutter dial tone when said particular subscriber location goes off-hook.

34. A method in accordance with claim 28 wherein:

said establishing of said suppressed ring connection comprises: using a control computer to receive said message waiting indicator request signal and to generate messages for a control processing means which establishes said suppressed ringing connection through said telephone switching network based upon said messages from said control computer.

35. A method in accordance with claim 34 wherein:

said control computer is a local control computer which monitors a link between said voice message system and said switching network.

36. A method in accordance with claim 35 wherein:

said link is a simplified message desk interface link.

37. A method in accordance with claim 35 further comprising:

based on said message waiting indicator request signal, controlling said telephone switching network so that said particular subscriber location receives stutter dial tone when said particular subscriber location goes off-hook.

38. A method in accordance with claim 34 wherein:

said control computer is a centralized control computer of said telephone system.

39. A method in accordance with claim 38 wherein:

said message waiting indicator request signal is communicated to said centralized computer over a data network and said centralized computer provides messages to said control processing means over a data network.

40. A method in accordance with claim 39 further comprising:

generating a further message waiting indicator request signal;

and based on said further message waiting indicator request signal, controlling said telephone switching network so that said particular subscriber location receives stutter dial tone when said particular subscriber location goes off-hook.

41. A method in accordance with claim 40 further comprising:

providing a telephone link for conveying said further message waiting indicator request signal.

42. A method in accordance with claim 41 wherein:

said telephone link is a simplified message desk interface link.

43. A method in accordance with claim 39 wherein:

said centralized control computer is a telemetry control computer used for telemetry operations in said telephone system.

44. A method in accordance with claim 28 further comprising:

generating a completion signal after said particular subscriber location accesses said voice message system;

and based on said completion signal, enabling deactivation of said visual indicator.

45. A method in accordance with claim 28 further comprising:

when a busy condition of said particular subscriber location prevents said suppressed ringing connection from being established to said particular subscriber location, further controlling said telephone switching network to transmit a message over the active connection to said particular subscriber location for activating and/or deactivating a visual indicator at said particular subscriber location.

46. A method in accordance with claim 45 wherein:

said further controlling is analogous to a Call Waiting message function controlling.

47. A method in accordance with claim 28 wherein:

when a busy condition of said particular subscriber location prevents said suppressed ringing connection from being established to said particular subscriber location, automatically attempting to establish said suppressed ring connection through said telephone switching network to said particular subscriber location when the busy condition of said particular subscriber location ends.

48. A method in accordance with claim 28 wherein:

said acknowledgement signal is an off-hook wink signal of predetermined duration.

49. A method in accordance with claim 48 wherein:

said predetermined duration is within a range of 500 msec to 1 second.

50. A method in accordance with claim 28 further comprising:

after waiting a predetermined time period for receipt of an acknowledgement signal, reattempting to establish a suppressed ringing connection through the telephone switching network to the particular subscriber location.

51. A method in accordance with claim 28 wherein:

said message waiting indicator request signal includes a signal code associated with a loop carrier; and said establishing of said suppressed ringing connection through the telephone switching network to the particular subscriber location utilizes said signal code.

52. A method in accordance with claim 51 further comprising:

upon receipt of said acknowledgement signal, updating a database with the signal code utilized to establish the suppressed ringing connection.

53. A method in accordance with claim 52 further comprising:

after waiting a predetermined time period for receipt of an acknowledgement signal, incrementing said signal code from a plurality of available signal codes for said subscriber locations;

reattempting to establish a suppressed ringing connection through said telephone switching network to the particular subscriber location using the incremented signal code;

further awaiting a further predetermined time period for receipt of an acknowledgement signal;

and repeating said incrementing, reattempting and further awaiting until an acknowledgement signal is received or the signal codes in said plurality of signal codes is exhausted.

* * * * *

UNITED STATES PATENT AND TRADEMARK OFFICE
CERTIFICATE OF CORRECTION

PATENT NO. : 5,521,964
DATED      : May 28, 1996
INVENTOR(S): Jerome W. Schull and Wayne R. Howe It is certified that error appears in the above-indentified patent and that said Letters Patent is hereby corrected as shown below:

On the title page, under Notice, Line 2, change "Nov. 8, 2011" to -- December 22, 2012 --.

Col. 2, line 65, change "system i" to -- system 1 --.

Signed and Sealed this

Twenty-fourth Day of December, 1996

Attest:

BRUCE LEHMAN

*Attesting Officer*      *Commissioner of Patents and Trademarks*